Figure 1:
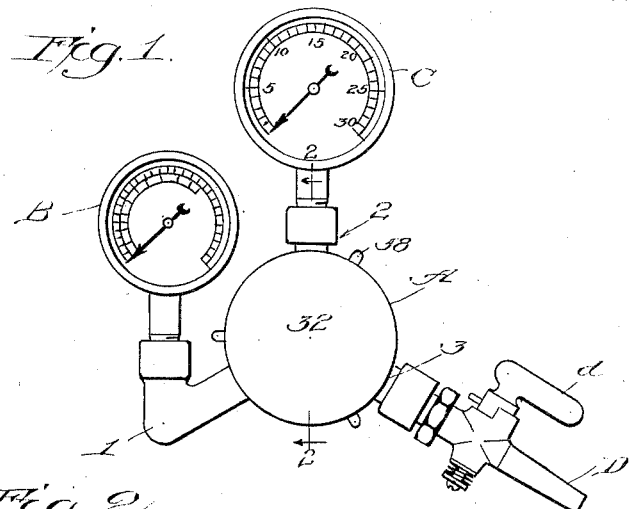

April 8, 1941.  A. L. KOENIG  2,237,940
PRESSURE REGULATING DISPENSING VALVE
Filed Oct. 15, 1938  3 Sheets-Sheet 1

Inventor:
A. L. Koenig,
by Wm. F. Freudenreich,
Atty.

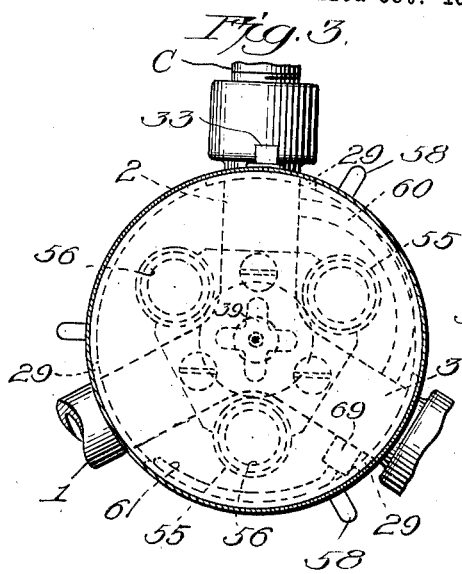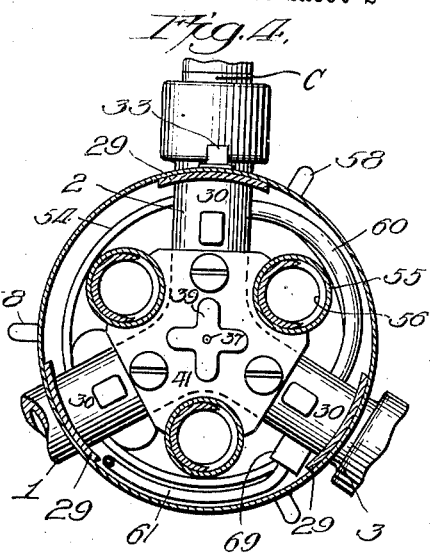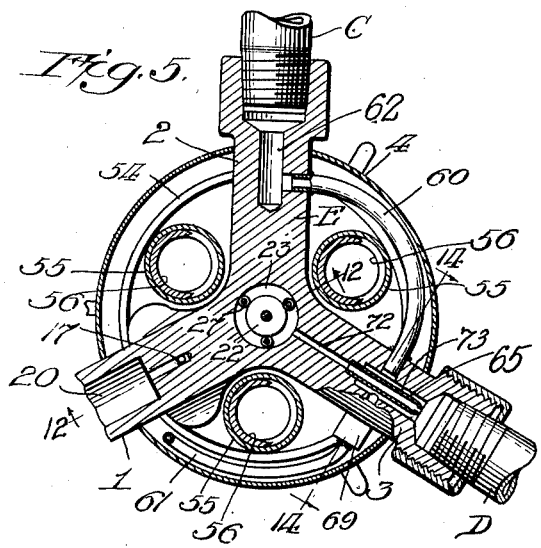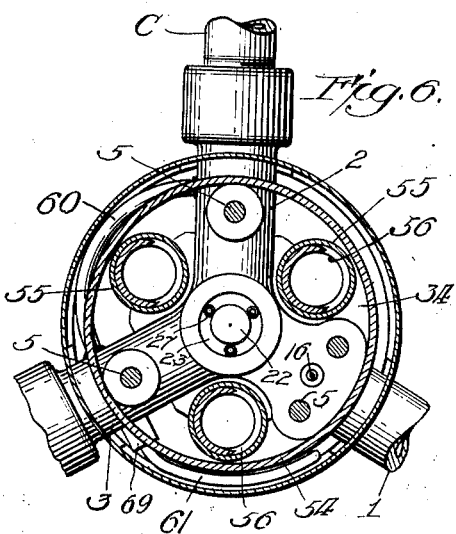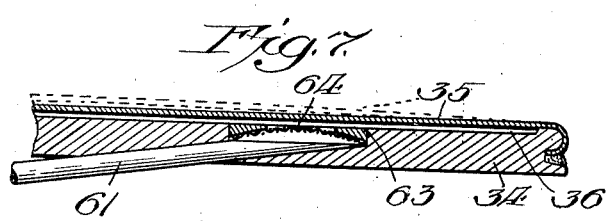

April 8, 1941. A. L. KOENIG 2,237,940
PRESSURE REGULATING DISPENSING VALVE
Filed Oct. 15, 1938 3 Sheets-Sheet 3
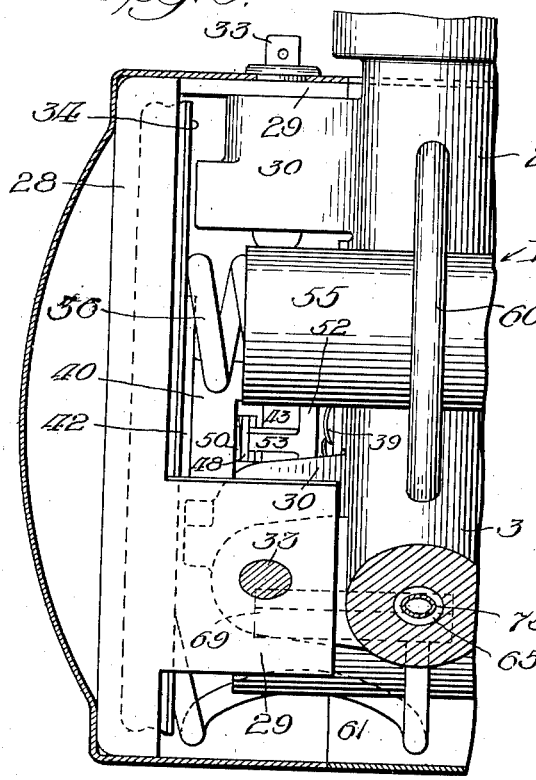
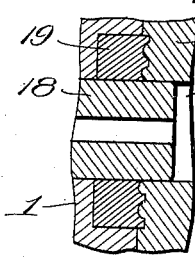
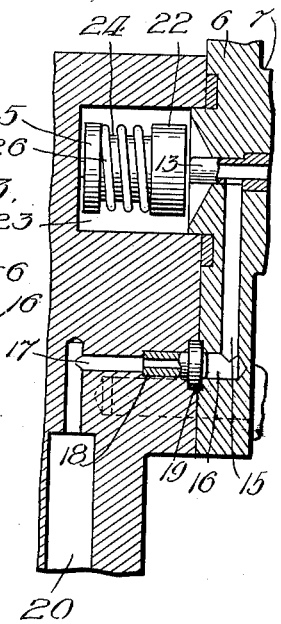
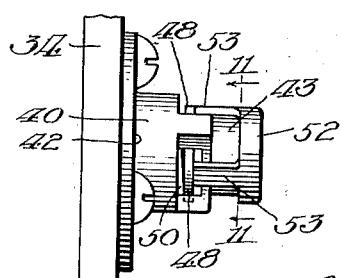
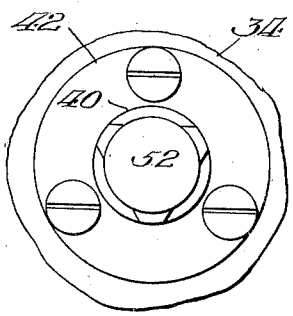
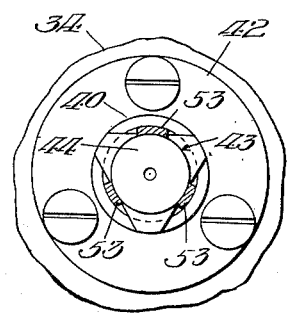
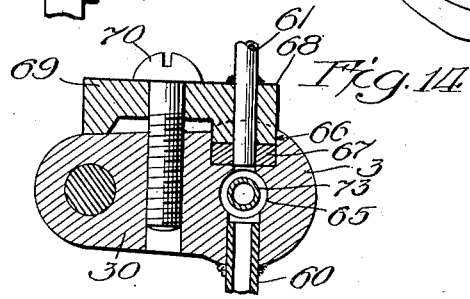
Inventor:
A. L. Koenig,
by Wm. F. Freudenreich,
Atty.

Patented Apr. 8, 1941

2,237,940

UNITED STATES PATENT OFFICE 2,237,940

PRESSURE REGULATING DISPENSING VALVE

Alphonso L. Koenig, Chicago, Ill.

Application October 15, 1938, Serial No. 235,186

13 Claims. (Cl. 50—23)

The present invention relates to valve devices or regulators adapted to permit fluids held under high pressure to be delivered or dispensed at variable, predetermined lower pressures. Some of the objects of the present invention are: to produce a device which will permit the pressure of the fluid at the point of use to be varied, either up or down, without requiring anything further to be done than the manipulation of a simple regulating or controlling handle, lever or other element; to permit discharge of the fluid from the device to be carried out at a maximum rate and at high pressure until the pressure in the system beyond the discharge side of the device is built up to the point desired, whereby a large container may be quickly filled even though the maximum pressure desired therein be low; to insure against back-flow of fluids through the device, in the event of an abnormal increase in the pressure on the discharge side; to insure against the creation of pressure conditions in the gauge member of the device that might be injurious to the latter; to permit operation at very low temperatures by insuring that in the event movable parts in the device happen to freeze to each other or to stationary parts, the grip on the movable parts is broken immediately upon the admission of fluid under pressure; to make it possible to dispense in liquid form a gas, as for example, carbon dioxide, which is delivered in cylinders or drums as a liquid; to make it possible to disconnect the device from one cylinder or drum or other source of supply, without requiring the operator to do anything toward shutting off communication between the device and the apparatus or thing that is supplied through the device; and to achieve a construction in which there is such a balancing of forces on the delicate, movable valve elements that the valves and valve seats are not required to resist heavy pressures which might injure them.

In carrying out my invention, I so confine the fluid passing through the regulator that practically the entire expansion of the same, whether in gaseous or liquid form, is caused to take place, in effect, beyond the regulator and not within the same. In other words, a gas may be successfully dispensed in the form of dry ice, because it does not attain such a state within the regulator, where it would cause the interior of the regulator to be filled solidly with ice, but beyond the regulator, where it can be acted on by the force of the fluid following after it, to be blown into and through the delivery conduit leading from the regulator. The invention may therefore be said to have a further object—the successful dispensing of fluids in the form of dry ice.

Figure 2:
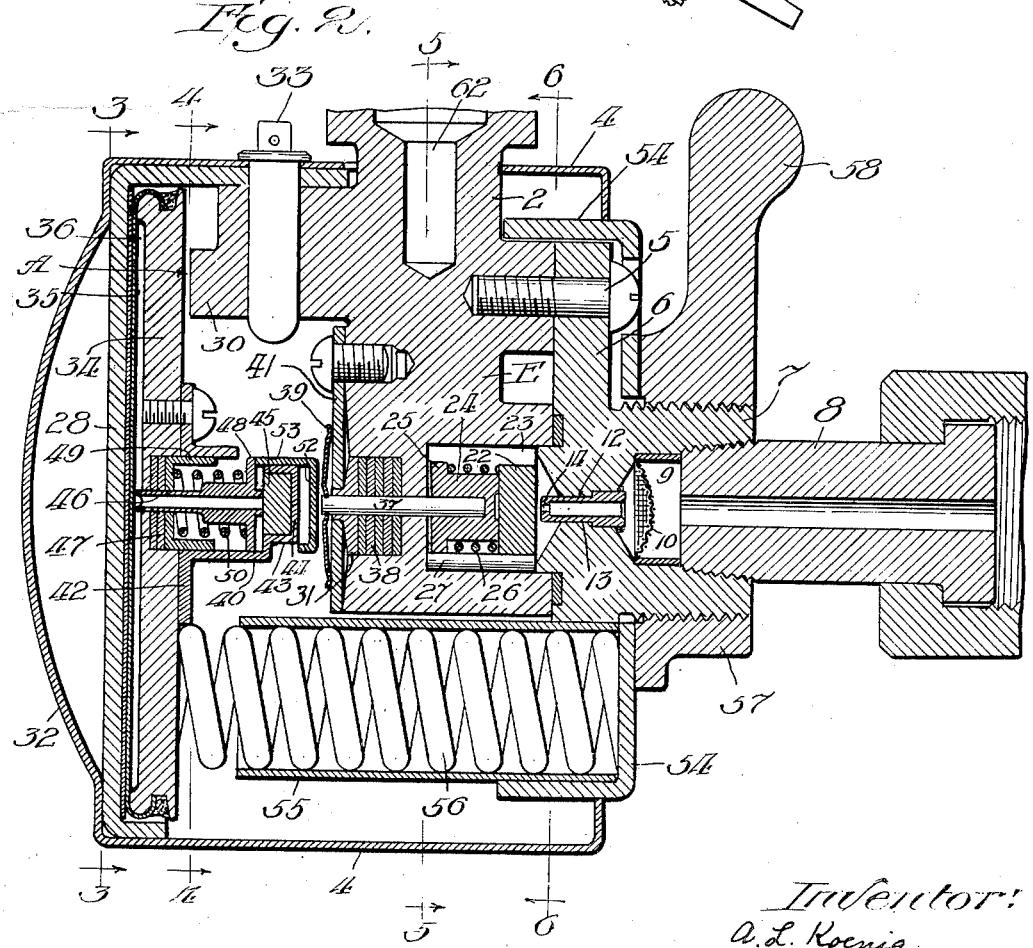

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a front view of a device embodying the present invention; Fig. 2 is a section on line 2—2 of Fig. 1, on a larger scale; Figs. 3, 4, 5 and 6 are sections taken respectively on lines 3—3, 4—4, 5—5 and 6—6 of Fig. 2, looking in the directions of the arrows associated with said lines, the scale being larger than that of Fig. 1 and less than that of Fig. 2; Fig. 7 is a section on a larger scale than Fig. 2, showing a fragment of the fluid-actuated pressure device; Fig. 8 is a view on the same scale as Fig. 2, showing a portion of the device mainly in elevation, with the outer casing in section; Fig. 9 is a side view of a fragment of the fluid-actuated pressure device, illustrating the relief valve; Fig. 10 is an elevational view of the parts shown in Fig. 9, looking at the device from the righthand side of Fig. 9; Fig. 11 is a section on line 11—11 of Fig. 9; Fig. 12 is a section on line 12—12 of Fig. 5, the scale being the same as that of Fig. 2; Fig. 13 is a section, on a much larger scale than Fig. 12, showing the formation of the joint between the two main castings appearing in Fig. 12, at the point where the long Z-shaped passage crosses from one of these castings to the other; and Fig. 14 is a section on line 14—14 of Fig. 5, on an enlarged scale, and showing only one of the spider arms and the connection therewith of the tubes on opposite sides thereof.

In the drawings I have illustrated my invention as embodied in a device adapted for use with gaseous fluids and, for the sake of brevity, the detailed description will be confined to this particular embodiment.

In Fig. 1 of the drawings, A represents the device as a whole. Attached to the same is a gauge B for indicating the pressure of the fluid which is being supplied to the device. A second gauge C indicates the pressure in the barrel, tank or other container which is being supplied with fluid under pressure through the device. D represents a nipple provided with a hand valve or cock $d$, to which a hose may be attached to carry the discharged fluid to the point of use.

The body of the valve device as a whole is in the form of a spider E comprising three arms 1, 2 and 3 equally spaced apart from each other and forming a single casting. The gauge B is mounted on the outer end of the arm 1, the gauge C on the outer end of the arm 2, and the nipple device D is screwed into the outer end of the arm 3. The inner portion of the spider is enclosed in a cylindrical shell 4 open on both ends, and forming part of the housing; the member 4 being fixed to the spider. Fastened to the rear side of the spider by screws 5 or other suitable means is a thick plate 6 having a hub 7 projecting rearwardly therefrom beyond the casing 4. Screwed into the outer end of the hub is a member 8 through which fluid under pressure may be delivered to the device from a drum, tank or other suitable source of compressed fluid. The large bore 9 into which the part 8 is screwed does not continue all the way through the hub and the plate 6, but stops a short distance inwardly from the inner end of the part 8 to provide a chamber within which there is arranged a filter 10 that may conveniently be in the form of a fine screen. In the web-like portion of the plate 6, that closes the inner end of the bore 9 in the hub, is a small bore 12 within which is fitted a member 13 that takes the form of an elongated thimble, the open end of which is toward the rear and the closed end of which is provided with a small orifice 14. The fluid that enters the regulator must all pass through this small orifice. However, since the gauge B is intended simply for the purpose of indicating the pressure at the source, a connection may be made directly from the large bore in the thimble through the arm 1 and to this gauge, as best shown in Fig. 12. It will be seen that the plate 6 is provided with a passage 15 opening into the body of the thimble 13 at one end and terminating at its other end in a branch 16 that opens out of the front face of the plate 6 just behind the arm 1 of the spider. This arm of the spider is provided with a passage 17 opening out through the rear face and containing a nipple 18 which projects slightly from said face in order to enter the passage 16 in the plate 6. Surrounding the nipple 18 is a suitable packing 19, as shown more in detail in Fig. 13, to insure that there will be no leakage of gas flowing from the pasasge 16 to the passage 17. The passage 17 communicates with a suitable passage 20 that extends throughout the length of the arm 1. Consequently, whenever fluid under pressure is admitted into the inlet side of the regulator, some of it immediately flows to the gauge B which thus indicates the pressure of the incoming fluid.

The forward end of the thimble 13 constitutes a stationary valve seat with which cooperates a valve in the form of a floating disk 22 of hard rubber or the like arranged within a cylindrical chamber 23 in the rear face of the central portion of the spider. In the chamber 23, behind the valve 22, is a cylindrical block or plug 24 having a flange 25 surrounding the rear end thereof. A light spring 26 surrounds the member 24, engaging with its forward end at the flange 25 and at its rear end with the valve 22. It is essential that the valve 22 be very accurately guided in its movement from and toward its seat, and I have therefore placed within the chamber 23 three small tubes 27 which are fixed to the spider, parallel with the axis of the particular valve assembly under discussion, at equal distances apart and just touching the disk valve.

Thus the valve is accurately centered but may be moved freely back and forth and, because the little guides make only line contact, they offer practically no resistance to movement of the valve along the same, nor do they afford opportunity for the valve to freeze thereto. The fluids entering the chamber 23 through the orifice 14 find their way to the gauge C and the delivery member D in a manner now to be explained.

In front of the spider is a thick disk 28 provided with three arms 29 projecting at right angles from one side thereof; each arm overlapping a forwardly projecting lug 30 on the spider; there being one of these lugs on each arm of the spider. The member 28 with its arms 29 is nested within a cup-shaped housing member 32 of the same diameter as the shell 4, and of such a size that when the member 32 is fitted in place, the rim thereof makes edge to edge contact with the shell 4. Both of the members 28 and 32 may be secured in place by means of pins 33, or the like, extending through the cylindrical part of the member 32, through the arms 29, and into the lugs 30.

Positioned behind the member or wall 28 and in front of the lugs 30 is a fluid pressure valve actuator. In the arrangement shown, this actuator comprises a thick disk 34 only slightly smaller in diameter than the disk 28. Covering the front side of the disk 34 and fixed thereto at its periphery in any suitable manner to provide a sealed joint, is a flexible diaphragm 35, preferably in the form of a thin metal sheet. The front face of the disk 34 is countersunk across almost the entire diameter thereof, so as to leave only a narrow annular ridge or rib along the edge; thereby providing a shallow chamber 36 of large diameter between the main portion of the diaphragm and the body of the disk 34. When fluid under pressure is introduced into the chamber 36, the diaphragm 35 is flexed but, since it is held against forward movement by the wall 28, the result is that the disk 34 is caused to move rearwardly, that is toward the right in Fig. 2. This rearward movement of the disk 34 is utilized to close or partly close the inlet valve and, at times, to open a relief valve.

The valve 22 may be positively pressed against its seat by means of a rod 37 coaxial with the thimble 12, extending through the central portion of the spider E lying directly in front of the chamber 22 and provided in this portion of the spider with a good packing 38 that will prevent leakage from the chamber 23 past this rod. This rod extends into but not entirely through the plug 24 which engages the front side of the valve 23. Connected to the front end of this rod is a dish-shaped leaf spring which must be flattened when the rod 37 is pushed rearwardly to close the inlet valve, and which serves to retract the rod, when free to do so.

The rod 37 is moved in the valve-closing direction by means mounted on the disk 34 of the actuator; this means including the relief valve to which reference has heretofore been made. In the arrangement shown, and as best seen in Figs. 2, 9, 10 and 11, there is attached to the rear side of the disk 34 and concentric with the same, a hollow post 40 having at the forward or base end a flange 42 by which the connection with the disk 34 is made. The member 40 comprises a tubular section which is reduced in diameter at the inner or rear end, as indicated at 43. The inner or rear end of the reduced section 43 is closed by a wall 44, so that this part of the post may be said to be in the form of a cup. In this cup is seated a disk 45 similar to the movable member 22 of the inlet valve proper. Within the portion of large diameter of the post 40 is mounted a movable valve member which is shown as comprising a long open ended tubular part 46 extending through the disk 34 so that the interior thereof is in communication with the chamber 36. The forward end of the member 46 passes through suitable packing 47 while the rear end has thereon a disk-like flange 48 of the same diameter as the interior of the main portion of the post. Surrounding the member 46 and pressing against the packing 47 is a cup-shaped follower 49 which partially houses a spring 50 that surrounds the member 46 and bears at one end against the flange 48 while engaged at its other end with the wall forming the bottom of the cup in the member 49. The disk-like flange 48 lies a little forward from the rear end of the member 46, so as to leave a little protuberance for engagement with the valve member 45; this protuberance constituting a valve seat as does the end of the thimble 12 and being the movable member of the relief valve. It will be seen that the spring 50 tends constantly to hold the valve seat on the member 46 against the valve member 45.

The post 40 does not engage directly with the rod 37, but is provided with a cap 52 that is fitted loosely over the part 43 of the post. This cap comprises a shallow cup-like portion provided with a plurality of arms 53 which form extensions or continuations of the cylindrical part of the cup-like portion of the cap. Portions of the walls of the post at the juncture of the part 43 with the main portion of the post are cut away so as to permit the arms 53 to engage with the disk-like flange 48 on the relief valve. The parts are so proportioned that when the arms on the cap contact the flange 48, the cap may be moved forwardly a considerable distance, comprising the spring 50 and moving the valve seat on the member 46 away from the valve 45 before the end of the cap strikes the wall 44 on the post. Conversely, if the cap 52 is held against movement rearwardly or to the right as viewed in Fig. 2, while the disk 34 and its post are pushed toward the right, the relief valve is of necessity opened, because the valve element 45 moves with the post, whereas the cooperating member is held against moving correspondingly by the arms 53 on the cap which acts as stops therefor. As a matter of fact, the pressure on the rod 37, tending to close the inlet valve, is applied through the spring 50 associated with the relief valve. It should be noted that the cap 52 engages with the cylindrical part of the end 43 of the post only along lines or extremely narrow bands extending lengthwise of the arms 53. Consequently, there is no danger that the cap will freeze to the post so as to prevent the carrying out of the necessary relative movements between the same.

When fluid under pressure is introduced into the chamber 36 of the fluid pressure actuator, the total pressure, due to the large diameter of the chamber 36, tending to move the disk 34 inwardly or rearwardly is so great that the little springs to which we have already referred can have no appreciable restraining influence. Therefore, in order to provide for regulating the action of the disk 34, strong springs are so placed as to resist rearward movement of the disk. It is only necessary to provide means for quickly and easily adjusting these strong springs, in order to vary the effect of a given pressure in the chamber of the fluid pressure actuator. In the arrangement shown there is slipped over the rear plate 6 and its hub 7 a cup-shaped member 54 through the bottom wall of which the hub 7 loosely passes. Fixed within the member 54, so that their axes are parallel with and distributed around the axis of the cup are three long tubes 55. In each of these tubes is a strong coiled spring 56 that extends throughout the length of the tube and projects from the free end of the latter into engagement with the rear face of the disk 34. Screwed upon the hub 7 is a nut 57 provided with radial arms or spokes 58 for turning the same. This nut engages with the flat wall of the cup-shaped member 54 and, when it is rotated in one direction, it compresses the springs 56 whereas, upon being rotated in the other direction, it reduces the compression of the springs. Consequently, by simply turning the nut 57, I am able to offer any desired degree of resistance, within predetermined limits, to rearward movements of the disk 34.

I shall now describe the manner in which fluid under pressure reaches the gauge C and the outlet device D. Referring to Figs. 5 to 8, it will be seen that there are two small curved tubes 60 and 61 extending from opposite sides of the arm 3 of the spider, at points near the periphery of the casing. The tube 60 is connected at its other end to the arm 2 which, as best shown in Fig. 5, has a bore 62 extending lengthwise into the same far enough to permit the tube to open into it. The tube 61, on the other hand, extends to the disk 34 of the fluid pressure actuator. This connection is shown in detail in Fig. 7. It will be seen that the disk 34 has a little recess 63 formed in the front face thereof. Within this recess is fixed a little screen 64. The tube 61 is connected to the disk 34 so that it opens into the pocket or recess 63 behind the screen, whereby any fluid that enters the chamber 36 must first pass through the screen. The details of the connections of the tubes 60 and 61 with the arm 3 are shown in detail in Fig. 14. From this figure it will be seen that the arm 3 has an axial bore 65. The adjacent end of the tube 60 is simply soldered or otherwise secured in a hole drilled into the arm 3 and intersecting the bore 65. The connection between the tube 61 and the arm 3 is a detachable one. A hole 66, of considerable diameter, is drilled into the arm 3, but not quite deep enough to reach the bore 65. A smaller hole 67 extends from the bottom of the hole 66 to the bore 65. Within the hole 66 is a packing ring 67 whose thickness is considerably less than the depth of the hole. The pipe 61 has thereon a thick sleeve 68, spaced a short distance from the end thereof and adapted to fit into the hole 66 beyond the packing ring 67; the protruding end of the tube extending down into the hole in the packing ring. The sleeve 68 has thereon a laterally projecting arm 69. A screw 70 extends through this arm and into the lug 30 on the arm 3. Upon loosening this screw, the tube 61 may be readily disconnected from the spider.

As best shown in Fig. 5, the bore 65 is placed in communication with the valve chamber 23 through a passage 72 which is considerably smaller in diameter than the bore 65. However, fluid flowing through the passage 72 does not enter the bore 65 directly, but flows through a nozzle 73 coaxial with this bore and extending throughout substantially the entire length of the latter. At any rate, the nozzle extends well past the points of juncture of the tubes 60 and 61 with the bore 65, with the result that when fluid is being discharged through the nozzle, it will tend to continue in the same direction as that in which it was travelling upon emerging from the nozzle and, until resistance is encountered to produce a backflow, there will be no fluid flowing into either of the tubes 60 and 61. In other words, if the device is attached to a tank, barrel or other container, the interior of which is not under considerable or any pressure, the fluid emerging from the nozzle will continue through the outlet device D and a partial vacuum may be set up in the gauge C and in the chamber 36 of the fluid pressure actuator. It is not until the pressure in the system beyond the fitting D rises sufficiently that there will be any backflow through the bore 65 and into the gauge and the fluid pressure actuator.

I shall now describe the operation of the device. In Fig. 2 the parts may be assumed to be in the positions which they occupy at the beginning of a dispensing operation. Since the rim of the cup-shaped member, acted upon by the regulating nut 57, is almost touching the arm 2 of the spider, the springs 56 are substantially under maximum compression. The gauge B simply indicates the pressure in the supply tank or drum. The pointer on the gauge C may still be at zero because of the injector effect of the nozzle 73 (Fig. 5) during the time the pressure in the system beyond the outlet fitting is building up. For the same reason the chamber 36 in the pressure responsive actuator may yet be free of pressure. As the pressure beyond the outlet rises, some of the fluid leaving the nozzle backs up into the tubes 60 and 61; thereby causing the pointer on the gauge C to begin to move and creating a pressure in the chamber 36. If the inlet valve is open wider than is necessary to maintain the desired pressure at the point of use, the disk 34 may begin to move back against the resistance of the springs 56 as the pressure is being built up; thus causing the inlet valve to be gradually closed to the proper point by the time that the pressure at the point of use has reached the desired value. If the regulating nut 57 had been shown partially unscrewed, the initial compression of the springs 56 would have been less than it is with the nut screwed on about as far as it can go. In that case, because the inlet valve is always wide open when fluid is passing through the regulator and there is not yet any pressure at the discharge outlet, the inlet valve would of necessity require a partial closing to keep the ultimate pressure beyond the outlet low enough.

Since the valve 22 is a floating valve and therefore balanced, it requires little pressure on the rod 37 to close the same. Consequently, when the disk 34 moves back under the influence of pressure in the chamber 36, the spring 50 need not be very heavy in order to be strong enough to hold the relief valve closed during this time.

When it is desired to reduce the pressure at the outlet, the nut 57 is simply backed off, thereby weakening the resistance of the springs 56 and permitting the pressure in the chamber to force the disk 34 farther back and cause: first, a complete closing of the inlet valve; and second, the opening of the relief valve due to carrying the valve member 45 away from the cooperating seat on the tubular stem 46. This permits fluid in the chamber 36 to flow out through the stem 46 and into the surrounding casing which is not sealed but contains open joints and openings that allow the escape of the fluid to the surrounding atmosphere. When the pressure has dropped to the desired lower point, (determined by the position of the nut 57) the disk 34 moves toward the front of the casing and restores the parts to the positions indicated in Fig. 2, except that the inlet valve will be more nearly closed. Obviously, if it be desired to increase the ultimate pressure beyond the discharge outlet, the nut 57 is simply screwed on a little farther, causing the disk 34 to move toward the front and permit a wider opening of the inlet valve.

It will be seen that the disk 34 will strike the lugs 30 before the end of the post 40 can strike the closed end of the cap 52, so that the entire force of the fluid pressure actuator cannot be applied directly to the rod 37 and to the inlet valve. By this means it becomes impossible for the inlet valve to be forced against its seat with a pressure so great as to damage one or the other. Similarly, the two members of the relief valve can never be pressed together with a force materially greater than that of the spring 50, because only the very small edge face area of the tubular stem 46 is subjected to the pressure in the chamber 36 in a manner to hold the end of the stem against the block 45.

In the event that there should be an abnormal increase in pressure on the outlet side of the device, such as might happen in case of fire, there could be no backflow of fluid through the inlet valve, because the movable member 22 of this valve has the capacity of acting as a check valve to prevent such backflow. At the same time, the device as a whole, including the gauge C, is protected because, as soon as the pressure in the chamber 36 exceeds that at which the device is intended to operate at that particular time, the relief valve is opened and the high pressure fluid is vented to atmosphere before a dangerous pressure can be established within the device and its adjuncts. This is, of course, only a further function of the mechanism that normally prevents the pressure beyond the outlet from becoming too high through the delivery of an excessive amount of fluid.

When it is desired to disconnect the regulator from an exhausted cylinder or drum, the operator simply disconnects the one cylinder or drum and attaches the other, without needing to do anything further. This is because as soon as the pressure at the inlet orifice 14 is released through separating the regulator from the source of supply, the pressure remaining in the chamber 23 and in the system beyond the same is sufficient to close the valve 22 and prevent the venting of the system beyond the regulator. As a matter of fact, the spring 26 is long enough to move the valve 22 against its seat except when a jet of fluid is being discharged against the same by the inlet orifice. Therefore, as soon as the regulator is disconnected from a cylinder or drum, the flow of fluid into the regulator ceases, and the spring 26 immediately becomes effective.

As pointed out heretofore, the fluid passing through the regulator is confined until it leaves the nozzle 73. While one effect of this construction is to guard against the imposing on the gauge C and the fluid pressure actuator the high pressures that exist within the chamber 23 at times when the inlet is wide open and the pressure in the system beyond the regulator is being built up, there is another very important advantage in this construction. There is enormous expansion of the fluid from the time it leaves the high pressure cylinder or drum and the time it reaches its ultimate destination at pressures of perhaps only a few pounds. This expansion, when quickly accomplished, produces intense cold; and, in the case of a fluid which is received in a liquid form as, for example, carbon dioxide, the rapid expansion of the fluid results in the formation of dry ice. In all regulators of which I am aware, there takes place within the same such an expansion of the fluids as to create temperatures low enough to produce dry ice. If it be attempted to deliver liquid carbon dioxide to these old types of regulators, the dry ice will form immediately in the interior of the regulator and render it inoperative, so that, heretofore, it has been necessary to withdraw carbon dioxide from the cylinders or drums in gaseous form. This has the further disadvantage that if the gas be rapidly withdrawn from above the liquid in a cylinder, such rapid evaporation of the liquid occurs as to cause a freezing within the cylinder. In the case of my regulator, on the other hand, liquid can be drawn through a tube or syphon extending down into the bottom of a cylinder or drum and, although dry ice is formed in the act of dispensing the liquid, this occurs beyond the nozzle 73 and the dry ice is blown along through the fitting D or other conduit or passage, by the jet issuing from the nozzle. My regulator may be mounted directly on a carbonator and discharge the carbon dioxide into the same in the form of dry ice which not only charges the water but also cools the same, so that less energy for water cooling purposes is required from external sources than would otherwise be the case.

Because the inlet valve permits fluids to enter the chamber 23 at high pressure, the same regulator may be utilized for dispensing at high or low pressures or at any intermediate pressure; the only change required being in the large springs 56 and in the gauge C. In other words, by providing a sufficient number of sets of what may be termed the regulating springs, the maximum pressure that may be built up in the container or system which is being supplied by the regulator may be accurately controlled through the use of the springs corresponding to such maximum pressure. While a single gauge might suffice for any pressure, it is preferable to employ a low pressure gauge when only low pressures are required, and other gauges for higher pressures.

In order that the regulator may be adjusted to permit the flow of fluid therethrough to be shut off completely or to be at such a rate as to begin pressures as low as can be read on the gauge C, the resilient, flexible diaphragm 35 is initially dish-shaped, so as to appear convex, from the outside, as illustrated in dotted lines in Fig. 7. Therefore, when the nut 57 is backed off far enough to relieve the disk 34 entirely of pressure by the springs 56, the resiliency of the diaphragm 35 is sufficient to hold the valve 22 closed against the pressure in the orifice 14. By turning the nut 57 so that initially the springs 56 bear against the disk 34 with a light pressure, the diaphragm 35 is required to yield sufficiently to permit the establishment of a corresponding pressure at the outlet whenever the device is in open communication with a source of supply of fluid at high pressure.

It is very essential that any changes which take place, due to wear, in the inlet and relief valves, be such as not to interfere with the proper calibration of the device. For this reason these two valves are made as nearly alike as possible; the members 22 and 45 being formed of the same material and the valve seat on the thimble 13 being of the same size and shape as that on the tubular member 46. Therefore, since the pressure is the same on one of these valves as on the other, such wear as takes place will be the same in each.

I have already explained that the packing 47 around the tubular valve member 46 is held under constant pressure, whereby a fluid-tight fit with the member 46 is obtained. A similar effect is secured in the case of the packing 38 which is engaged by a metal follower 31 against which presses a strong spring plate 41; the plate 41 being normally dish-shaped, with the convex side toward the member E. When the plate 41 is fastened to the member E and partially flattened, it exerts a strong, yieldable pressure on the follower 31. The plate 41 has a further, more or less incidental function, namely that of serving as a spreader and partial support for the spring-containing sleeves 55.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A pressure regulator having an inlet and a larger outlet, an inwardly-opening check valve for said inlet, means to discharge fluids in the form of a jet through the outlet; a fluid-pressure responsive actuator; means interposed between said check valve and the actuator to transmit pressure to the valve to close the same, said means including a spring that permits the actuator to move a limited distance after the check valve is closed; and means for imposing on the actuator pressure determined by the pressure in the outlet around but not in the path of the said jet.

2. A pressure regulator having an inlet and a larger outlet, an inwardly-opening check valve for said inlet, means to discharge fluids in the form of a jet through the outlet; a fluid-pressure responsive actuator; means interposed between said check valve and the actuator to transmit pressure to the valve to close the same, said means including a spring that permits the actuator to move a limited distance after the check valve is closed; means for imposing on the actuator pressure determined by the pressure in the outlet around but not in the path of the said jet; a safety valve; and means to cause the safety valve to open when the actuator travels beyond the point required to close the check valve.

3. A pressure regulator having an inlet and a larger outlet, an inwardly-opening check valve for said inlet, means to discharge fluids in the form of a jet through the outlet; a fluid-pressure responsive actuator; means interposed between said check valve and the actuator to transmit pressure to the valve to close the same, said means including a spring that permits the actuator to move a limited distance after the check valve is closed; a pressure gauge; and means for imposing on the actuator and on the gauge pressure determined by the pressure in the outlet around but not in the path of the said jet.

4. A pressure regulating device having a receiving chamber for fluids, an inlet to that chamber, and an outlet chamber; a valve in said receiving chamber for closing said inlet or leaving it partially or wholly open; a valve-closing member extending into said receiving chamber for engagement with said valve; a light spring acting constantly on said valve and tending to hold it closed; a connection between said chambers including a nozzle projecting into the outlet chamber; and means including a fluid-pressure responsive actuator for said member governed by the pressure in the latter chamber around the nozzle and inwardly from the outer end of the latter for transmitting pressure from the actuator to the valve independently of the aforesaid spring and closing or partially closing said valve against the pressure in the inlet.

5. A pressure regulating device having a receiving chamber for fluids, an inlet to that chamber, and an outlet; an inwardly-opening check valve for said inlet arranged in said chamber; means to cause the fluid to be discharged through the outlet in the form of a jet; a fluid-pressure responsive valve actuator of very large area compared to the area of the inlet; means for imposing on said actuator the pressure at the outlet around but out of the path of the jet; a post projecting from said actuator in line with said valve and yieldable lengthwise under pressures greater than that required to hold the valve closed when the inlet is communicating with a source of supply of fluid under pressure; a strut extending between the post and the valve to transmit the thrust from the post to the latter; a spring acting constantly on the valve to close the same when there is no pressure in the inlet; and a stop to arrest valve-closing movements of said fluid-pressure responsive actuator before the capacity of said post to yield further has been destroyed following the closing of the valve by said element.

6. A pressure regulator, including a casing, having an inlet and a larger outlet, an inwardly-opening check valve for said inlet, means to discharge fluids in the form of a jet through the outlet; a fluid-pressure responsive actuator in the form of a chambered member comprising a rigid disk and a flexible disk registering with each other and joined together at their peripheries; the actuator being arranged loosely in the casing, coaxial with the valve and with the rigid disk on the side toward the valve; means interposed between said check valve and the actuator and including a spring that permits the actuator to move a limited distance after the check valve is closed, for closing the latter; means for imposing on the actuator pressure determined by the pressure in the outlet around but not in the path of the said jet; a safety valve; and means to cause the safety valve to open when the actuator travels beyond the point required to close the check valve.

7. A pressure regulator, including a casing, having an inlet and a larger outlet, an inwardly-opening check valve for said inlet, means to discharge fluids in the form of a jet through the outlet; a fluid-pressure responsive actuator in the form of a chambered member comprising a rigid disk and a flexible disk registering with each other and joined together at their peripheries; the actuator being arranged loosely in the casing, coaxial with the valve and with the rigid disk on the side toward the valve and the flexible disk engaged with a wall of the casing; means interposed between said check valve and the actuator and including a spring that permits the actuator to move a limited distance after the check valve is closed, for closing the latter; means for producing in the chamber of the actuator a pressure determined by the pressure in the outlet around but not in the path of the said jet; a safety valve; and means to cause the safety valve to open when the said spring is stressed beyond a predetermined point.

8. A pressure regulator having an inlet and a larger outlet, an inwardly-opening check valve for said inlet, means to discharge fluids in the form of a jet through the outlet; a fluid-pressure responsive actuator; means interposed between said check valve and the actuator to transmit pressure to the valve to close the same, said means including a spring that permits the actuator to move a limited distance after the check valve is closed; means for imposing on the actuator fluid pressure determined by the pressure in the outlet around but not in the path of the said jet; compression springs acting on the actuator to resist the action thereof in a valve-closing direction; and a manually operable controlling member to vary the pressure of the latter springs against said actuator.

9. A pressure regulating device having a receiving chamber for fluids, an inlet to that chamber, and an outlet; an inwardly-opening check valve for said inlet arranged in said chamber; means to cause the fluid to be discharged through the outlet in the form of a jet; a fluid-pressure responsive valve actuator including a rigid disk of very large area compared to the area of the inlet and movable in the direction of the check valve when the actuator is energized; means for energizing the actuator with a pressure corresponding to that at the outlet around but out of the path of the jet; a means extending from said disk in line with said valve and yieldable lengthwise under pressures greater than that required to hold the valve closed when the inlet is communicating with a source of supply of fluid under pressure; a member spaced apart from the disk on the side toward the valve; a group of strong compression springs carried by said member and pressing against said disk; and means, including a controlling handle, to force said member toward or permit it to recede from the disk in order to vary the degree of compression of said springs.

10. A pressure regulator, including a casing, having an inlet and a larger outlet, an inwardly-opening check valve for said inlet, means to discharge fluids in the form of a jet through the outlet; a fluid-pressure responsive actuator in the form of a chambered member comprising a rigid disk and a flexible, resilient disk or diaphragm registering with each other and joined together at their peripheries; the actuator being arranged loosely in the casing, coaxial with the valve, with the rigid disk on the side toward the valve, and with the flexible disk dished outwardly; means interposed between said check valve and the actuator and including a spring that permits the actuator to move a limited distance after the check valve is closed, for closing the latter; means for imposing on the actuator pressure determined by the pressure in the outlet around but not in the path of the said jet; a safety valve; means to cause the safety valve to open when the actuator travels beyond the point required to close the check valve; strong compression springs bearing against the rigid disk of the actuator; and a manual controller to regulate the resistance which the latter springs offer to movements of said rigid disk.

11. In a valve device for dispensing fluids supplied at very high pressures, a body member having a small receiving chamber and a restricted inlet orifice therefor, a loose valve in said chamber movable from and toward said orifice, said body member having also an outlet chamber, a nozzle opening into said outlet chamber, said body member having a passage connecting the receiving chamber to the nozzle, the parts being so proportioned that fluids flowing through the device are confined and prevented from expanding to any considerable extent before leaving the nozzle, and a light spring tending constantly to move said valve into orifice-closing position, a pressure-responsive element, and means to transmit a yielding thrust from said element directly against said valve to move it into its orifice-closing position.

12. In a valve device for dispensing fluids supplied at very high pressures, a body member having a small receiving chamber and a restricted inlet orifice therefor, a loose valve in said chamber movable from and toward said orifice, said body member having also an outlet chamber, a nozzle opening into said outlet chamber, said body member having a passage connecting the receiving chamber to the nozzle, the parts being so proportioned that fluids flowing through the device are confined and prevented from expanding to any considerable extent before leaving the nozzle, a light spring tending constantly to move said valve into orifice-closing position, a pressure-responsive element, a safety valve, a spring tending to hold the safety valve closed, and means including the latter spring to transmit a closing pressure from said pressure-responsive element directly against the first-mentioned valve.

13. In a valve device for dispensing fluids supplied at very high pressures, a body member having a small receiving chamber and a restricted inlet orifice therefor, a valve in said chamber movable from and toward said orifice, said body member having also an outlet chamber, a nozzle opening into said outlet chamber, said body member having a passage connecting the receiving chamber to the nozzle, the parts being so proportioned that fluids flowing through the device are confined and prevented from expanding to any considerable extent before leaving the nozzle, a slidable thrust rod extending through a solid part of the body member into said chamber and adapted to engage at one end with said valve and push it into orifice-closing position, a stuffing box surrounding the rod, and a pressure-responsive element cooperating with the other end of said rod to move the rod in the orifice-closing direction.

ALPHONSO L. KOENIG.